May 12, 1925.

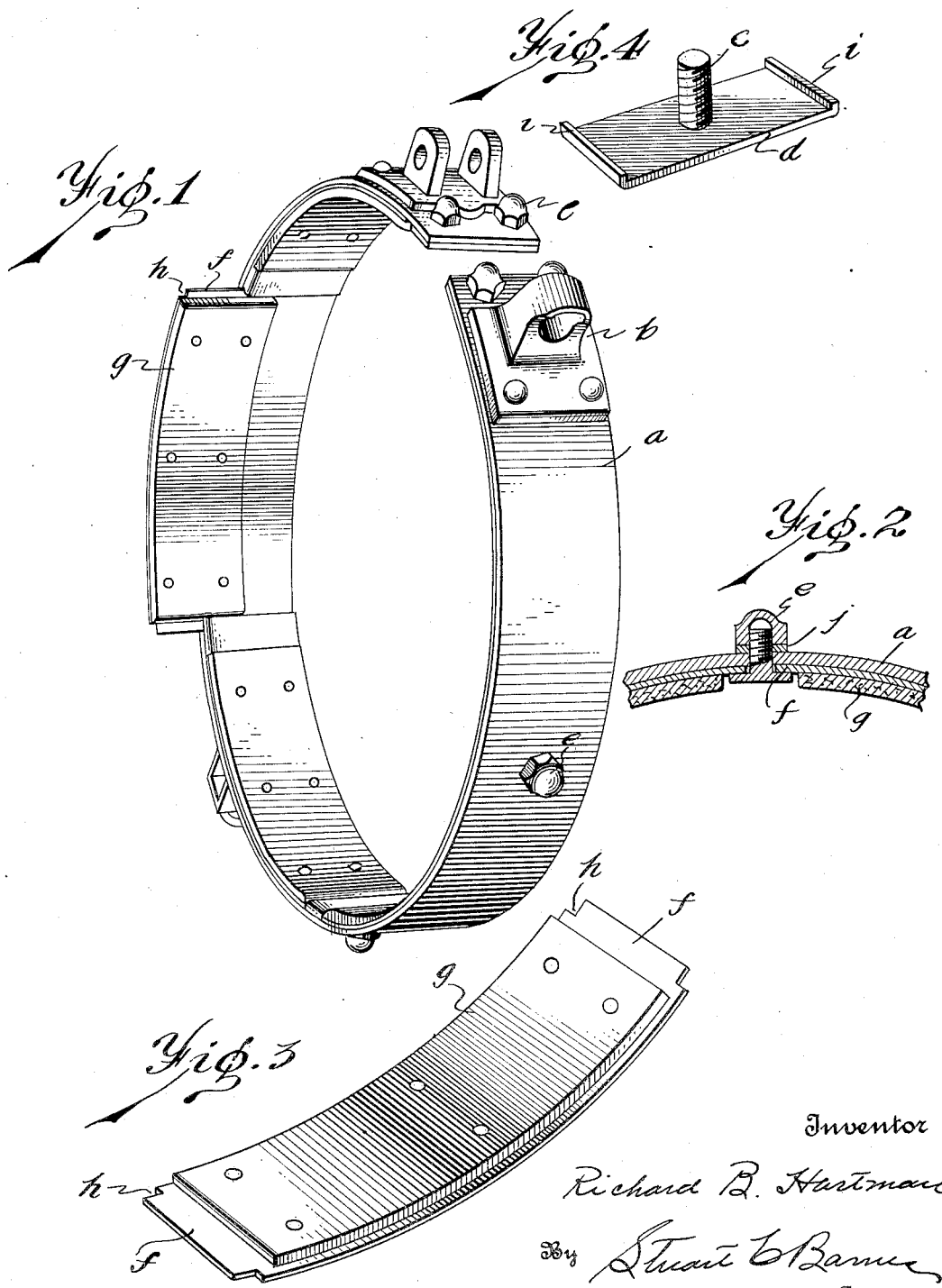

R. B. HARTMAN

BRAKE BAND AND LINING

Filed Jan. 30, 1920

Inventor
Richard B. Hartman
By Stuart C. Barnes
Attorney

Patented May 12, 1925.

1,537,232

UNITED STATES PATENT OFFICE.

RICHARD B. HARTMAN, OF MIDDLETOWN, OHIO, ASSIGNOR TO HARTMAN BRAKE CORPORATION.

BRAKE BAND AND LINING.

Application filed January 30, 1920. Serial No. 355,285.

*To all whom it may concern:*

Be it known that I, RICHARD B. HARTMAN, a citizen of the United States, residing at Middletown, in the county of Butler and State of Ohio, have invented certain new and useful Improvements in Brake Bands and Linings, of which the following is a specification.

This invention relates to brake linings and has for its object a brake lining for an ordinary band brake which can be supplied in sections and the sections reversed or renewed without disassembling the brake. The worn section can be easily removed without distortion from the brake band and reversed, or a new section supplied and fastened in place by the owner of the car.

The re-lining of brakes is a job that now requires the services of an expert repair man. It is also a relatively costly job. Furthermore, the ordinary brake lining wears out usually at the extreme ends while the intermediate portion of the lining is still perfectly good, which results in a waste of material, it being required to completely re-line the brakes to supply a deficiency which exists in only one portion of the lining. These objections are overcome by my new sectional lining.

In the drawings,—

Fig. 1 is a perspective of a brake band equipped with my improved sectional lining.

Fig. 2 is a longitudinal fragmentary section through the brake band and lining.

Fig. 3 is a perspective of one of the brake lining segments.

Fig. 4 is a perspective of one of the clamps.

Figure 5:
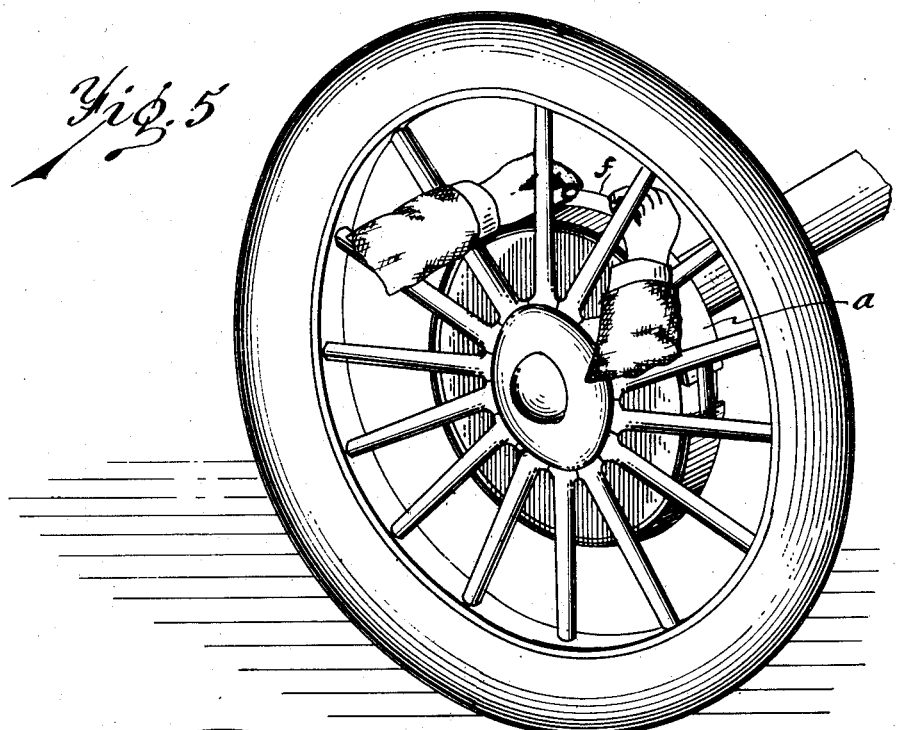
Fig. 5 is a perspective showing a new brake lining section being inserted from the outside of a wooden spoke wheel.

$a$ designates an ordinary brake band which has a substantially cylindrical braking face and which is in no respects different from the brake band that is used on most automobiles, with the possible exception that all brake bands do not extend beyond the ears $b$ which serve for attachment of brake-operating parts. The band is adapted to be moved substantially radially upon the drum in the accustomed way. The drum has a cylindrical braking surface unobstructed or open on at least one side. At a number of points along the brake band the same is drilled to receive the threaded studs $c$ of the clamps $d$. There is one stud for each clamp except for the end clamps there are two studs. Blind nuts $e$ are adapted to engage the threads on the ends of the studs $c$ and securely draw the clamp to the band.

Each of the clamps, except the end clamps, is adapted to clamp two adjoining brake lining segment ends to the band. Each one of these brake segments comprises a flexible cylinder segment of metal $f$ to which is riveted a piece of asbestos or other brake lining material $g$ that does not quite reach either end of the segment so as to leave a portion of the segment to be engaged by the clamp $d$.

It will be noticed that the metal backing strip $f$ of each segment is notched at each of its four corners. The notch is designated $h$. It will also be noticed that the ends of the clamping plates $d$ are turned over to form lips $i$. These lips $i$ are adapted to fit into recesses formed by two adjoining notches $h$. Hence after the clamp is drawn up, it not only frictionally holds the segment from side movement by the plate jamming the exposed end portions $f$ against the face of the band, but the turned-over lips lock into the notches $h$ and form a positive restraint against sidewise movement.

It will be evident to anyone how easily a worn segment can be removed and reversed or a new segment of lining put in its place. All it is necessary to do is to release the blind nuts $e$ with a wrench. This releases the clamping plates $d$ and allows the part-cylinder-like brake segment intervening between the two clamping plates to be easily slipped out between the open side of the cylindrical braking surface of the drum and the cylindrical braking face of the band. The old segment can be reversed, end for end, or a new segment may then be slipped in. When the segment is lined up with the brake band, the clamps can be again tightened by turning down the blind nuts until the clamps are drawn tightly up against the end portions of the segments. In this position they are below the plane of the lining, as is clearly shown in Fig. 2, and in no way interfere with the braking action. It is preferable to use spring lock washers *j* between the blind nuts and the brake band so as to hold the nuts from moving on the stud.

From the above description it will be apparent that practically the same form of brake band as is in common use may be employed. Practically the only difference is that it will have to be bored to allow the threaded studs to pass through. The only additional equipment required for the renewable sectional lining is a set of segments and a set of clamps. Segments can be carried by the car owner and, at any time he desires, he may re-line a portion or his entire brake. Or, for that matter, without any new segments, such an emergency as unusual wear of the brakes due to mountain driving may be satisfactorily met by shifting the segments around in the brake band or by reversing some of them.

The segments complete—backing and lining—can be carried in various sizes for standard cars by repair men and garage men so that they may be had with little difficulty when needed.

It is not broadly new to make up a brake band of sectional wear pieces, but so far as I am aware no band of the type such as used on the modern automobile has been constructed to have sectional wear pieces and I believe no band and brake drum has heretofore been provided with sectional wear pieces designed or adapted to be removed between the drum and the brake band without disassembling the brake and drum.

It has been proposed to provide cone clutch members with removable wear sections but so far as I am informed these have not proved successful and have not been to any extent used. If the clearance between the driven clutch member and the driving clutch member of the cone clutch be the usual small amount that is permitted in practice, the cone sections cannot be inserted or removed except with great difficulty. A cone section of any material width must be considerably distorted in order to be inserted or removed between two concentric and closely contiguous conical surfaces. The arcs at either side of the cone segments are a different size and consequently the segment has to be considerably spread and distorted in order to insert the side of the segment of smaller diameter between the arcs at the sides of the clutch members of larger diameter or the side of the segment of larger diameter has to be considerably distorted to be inserted between the clutch members at the side of smaller diameter. The same is true in removing the segment. This, of course, means that the segment will strongly resist either removal or placing. No such action occurs with my segments, which are cylindrical and of uniform diameter and slide freely in and out when the clamps are released. It will also be obvious that a cone segment cannot be reversed. In brake bands the first point to wear out is usually that closely adjacent the brake band ends. Consequently greater wear can be gotten out of the lining by reversing the segments or exchanging the segments from one place to another on the band, or both reversing or exchanging segments. Cone segments are not only not reversible but in a clutch construction the wear is always even and substantially equal in all sections.

Figure 6:
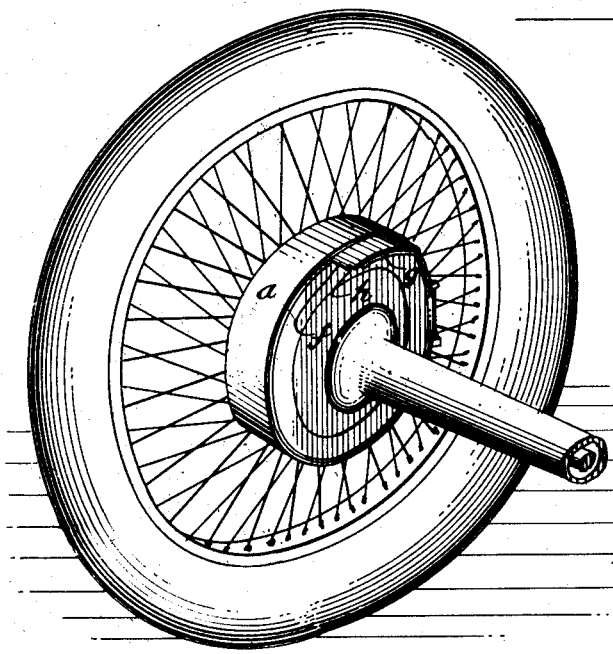
Fig. 6 is a perspective showing a new section being inserted in a wire wheel brake.

My improved brake lining segments may be inserted from either side of the wheel. In Fig. 5, I have shown a convenient way of inserting or removing a segment in a wooden spoke wheel. All that is required is to loosen two of the nuts in the band, reach between the spokes as shown in Fig. 5, and remove the segment and either reverse it or place a new one in its place. In Fig. 6, I have shown a wire wheel with a segment partly out. It will be found more convenient with wire wheels to remove or place a segement from the inside of the wheel. It will be also obvious that with the wheel removed, the brake segments may be easily removed, reversed or replaced from either side of the brake band.

What I claim is:

1. In a brake, the combination of a rotatable drum having a braking surface of substantially uniform radius from side to side and open on one side of the drum, a braking member provided with a face substantially concentric with the braking surface and open on the side that the braking surface of the drum is open, said braking member movable substantially radially toward and away from the drum, a plurality of brake lining segments of substantially uniform radius from side to side adapted to slide freely between the face of the braking member and the braking surface of the drum at the open side of these members when the segments are unsecured, and means for releasably securing the segments to the face of the braking member.

2. In a brake, the combination of a rotatable drum having a braking surface of substantially cylindrical shape and open on one side of the drum, a braking member provided with a face substantially concentric with the braking surface and open on the side that the braking surface of the drum is open, said braking member movable substantially radially toward and away from the drum, a plurality of brake lining segments of substantially the shape of cylinder segments adapted to slide freely between the face of the braking member and the braking surface of the drum at the open side of these members when the segments are unsecured, and means for releasably securing the segments to the face of the braking member.

3. In a brake, the combination of a rotatable drum having a braking surface of substantially uniform diameter from side to side and open at one side of the drum, a braking member provided with a face substantially concentric with the braking surface of the drum and open on the side that the braking surface of the drum is open, said braking member movable substantially radially toward and away from the drum, a plurality of brake lining segments of substantially uniform radius from side to side and adapted to slide freely between the face of the braking member and the braking surface of the drum at the open side of these members when the segments are unsecured, each brake lining segment made up of a relatively thin metal strip as a backing and a strip of brake lining material secured to the face thereof, and means engaging the backing strips for releasably securing the segments to the braking member.

4. In a brake, the combination of a rotatable drum having a braking surface of substantially uniform diameter from side to side and open on one side of the drum, a contractible brake band provided with a face substantially concentric with the braking surface of the drum and open on the side that the braking surface of the drum is open, a plurality of brake lining segments in the form of cylinder segments adapted to slide freely between the face of the brake band and the braking surface of the drum at the open side of these members when the segments are unsecured, and means engaging the segments for releasably securing the segments to the brake band.

5. In a brake, the combination of a rotatable drum having a braking surface of substantially uniform diameter from side to side, a brake band that can be contracted upon the drum and having a face substantially concentric with the braking surface of the drum, said band being open on the side that the braking surface of the drum is open, a plurality of brake lining segments of substantially uniform radius from side to side adapted to slide freely between the face of the brake band and the braking surface of the drum at the open side of these members when the segments are unsecured, each brake lining segment made up of a relatively thin, flexible, stiff strip as a backing and a strip of brake lining material secured to the face thereof, and means engaging the backing strips for releasably securing the segments to the brake band.

6. In a brake, the combination of a rotatable drum having a braking surface of substantially uniform radius from side to side and open on one side of the drum, a brake band provided with a face substantially concentric to the braking surface of the drum and open on the side that the braking surface of the drum is open, said brake band adapted to be constricted upon the drum, a plurality of brake lining segments of substantially uniform radius from side to side which are adapted to slide freely between the face of the brake band and the braking surface of the drum at the open side of these members when the segments are unsecured, each brake lining segment made up of a relatively thin, flexible, stiff strip as a backing and a strip of brake lining material secured to the face thereof but running short of the ends to leave exposed surfaces at the ends, and means engaging the backing strips at the exposed ends for releasably securing the segments to the brake band.

7. In a brake, the combination of a rotatable drum having a braking surface of substantially uniform radius from side to side and open on one side of the drum, a brake band provided with a face substantially concentric with the braking surface of the drum and open on the side that the braking surface of the drum is open, said brake band adapted to be constricted upon the drum, a plurality of brake lining segments of substantially uniform radius from side to side which are adapted to slide freely between the face of the brake band and the braking surface of the drum at the open side of these members when the segments are unsecured, each brake lining segment made up of a relatively thin, flexible, metal strip as a backing and a strip of brake lining material secured to the face thereof but running short of the ends, and clamps engaging the brake band and also engaging the exposed ends of the backing strips for releasably securing the segments to the brake band.

8. In a brake, the combination of a rotatable drum having a braking surface of substantially cylindrical shape and open on one side of the drum, a braking member provided with a face substantially concentric with the braking surface of the drum and open on the side that the braking surface of the drum is open, said braking member movable substantially radially toward and away from the drum, a plurality of brake lining segments of substantially the shape of cylinder segments adapted to slide freely between the face of the braking member and the braking surface of the drum at the open side of these members when the segments are unsecured, each of the said segments made up of a thin metal backing and a brake lining material secured thereto but running short of the ends leaving exposed portions of the backing at the ends of the segments, and clamps engaging the braking member and bearing against the exposed ends of the backing of the segments for holding the segments to the braking member.

9. The combination with a brake band, of a lining therefor formed of a number of sections, a carrying member for each section, and clamping plates for holding the members to the band, each of said plates having bent ends engaging the edges of the members, and a bolt for holding the plate to the band.

10. The combination with a brake band, of a lining therefor formed of a number of sections, a carrying member for each section having its end reduced in width by recessing the corners, and clamping plates engaging said reduced ends and having their ends bent to engage the recesses and having bolts thereon for engaging the band.

11. The combination with a brake band, of a lining therefor formed of a number of sections, a carrying member for each section, and clamping plates for holding the members to the band, each of said plates having bent ends engaging the edges of the members, and means for holding the plates to the band.

12. In a brake, the combination of a rotatable drum having a braking surface of substantially uniform diameter from side to side and open on one side of the drum, a braking member provided with a face substantially concentric with the braking surface of the drum and open on the side that the braking surface of the drum is open, said braking member movable substantially radially toward and away from the drum, a plurality of brake lining segments of substantially uniform radius from side to side and adapted to slide freely between the face of the braking member and the braking surface of the drum at the open side of these members when the segments are unsecured, each brake lining segment made up of a relatively thin, stiff strip as a backing notched at the corners and with a strip of brake lining material secured to the face of the backing but running short of the ends, and clamps having plate portions adapted to bear against the exposed ends of the backings, and lips adapted to be turned into the notched corners of the segments, the said clamps being engagable with the braking member.

13. In a brake, the combination of a brake band, a drum having a cylindrical braking surface, a plurality of lining segments comprising each a backing and a lining therefor extending short of the two ends of the backing and forming cylinder segments, and means engaging with the brake band and the exposed ends of the backing to removably hold the segments in place so that any one of them may be removed and replaced without disassembling the band from the drum.

14. In a brake, the combination of a brake band provided with a plurality of perforations therethrough, a plurality of brake lining segments comprising each a rigid backing and a lining extending short of the two ends of the backing to leave exposed portions, and clamps having threaded stud members passing through the perforations in the brake band and having plate portions adapted to removably engage the exposed ends of the backing and pinch the segment between the plate and the band.

15. In a brake, the combination of a brake band, a plurality of perforations therethrough, a plurality of brake lining segments comprising each a backing and a lining extending short of the two ends of the backing to leave an exposed portion of the backing, and clamps comprising plate-like members adapted to engage the exposed ends, threaded studs adapted to pass through the perforations in the band, means engaging the segments to lock them against sidewise movement, and nuts on the outside of the band adapted to engage the threads of the studs to hold the clamping plates against the exposed ends of the segment backing.

16. In a brake band, the combination of a flexible band, a drum provided with a cylindrical periphery open at one side, brake lining segments in the form of cylindrical segments, and means for securing the segments to the band so that one or more segments can be removed between the band and drum and replaced.

17. In a brake, the combination of a drum, a flexible band adapted to be constricted upon the drum, a plurality of brake lining segments insertable between the drum and band at either side, the segments comprising each a backing and a facing of brake lining material, and means for releasably securing the segments to the brake band so that they may be removed and replaced.

18. The combination with a brake band, of a lining therefor composed of a plurality of sections adapted to be secured to said brake band, said brake band having fastener receiving means adjacent the end of each section, fastening means co-operating with the ends of said sections and fastener receiving means of the brake band for removably connecting the sections to the brake band, and friction material permanently attached to each section.

19. In a brake, the combination of a rotatable drum having a braking surface of substantially uniform radius from side to side and open on one side of the drum, a braking member provided with a face substantially concentric with the braking surface and open on the side that the braking surface of the drum is open, said braking member movable substantially radially toward and away from the drum, a plurality of brake lining segments adapted to slide freely between the face of the braking member and the braking surface of the drum at the open side of these members when the segments are unsecured, and means for releasably securing the segments to the face of the braking member.

20. In a brake, the combination of a rotatable drum having a braking surface of substantially uniform diameter from side to side, a brake band that can be contracted upon the drum and having a face substantially concentric with the braking surface of the drum, said band being open on the side that the braking surface of the drum is open, a plurality of brake lining segments adapted to slide freely between the face of the brake band and the braking surface of the drum at the open side of these members when the segments are unsecured, each brake lining segment made up of a relatively thin, flexible, stiff strip as a backing and a strip of brake lining material secured to the face thereof, and means engaging the backing strips for releasably securing the segments to the brake band.

21. In combination, a brake band, a lining therefor formed of a plurality of sections, a carrying member for each section, fastening elements, coacting means on the elements and members for removably holding the members to the band, and means on each element for securing it to the band.

22. As an article of manufacture, a brake lining segment including a carrying member and friction material secured thereto and of a length less than that of the carrying member, the carrying member having the portions which project beyond the friction material provided with reduced clamp-engaging extremities.

23. In combination, a brake band, a lining therefor including a plurality of sections adapted to be carried by the brake band, each section comprising a carrying member and friction material secured thereto, fastening means engageable with the ends of the sections and securable to the brake band, and means for securing the fastening means to the brake band.

24. As an article of manufacture, a brake device including a brake band and a lining therefor comprising a plurality of removable sections, each section comprising a carrying member and friction material secured thereto, and means for removably mounting the sections on the brake band and including a clamping element common to two of the sections, means for securing the element to the brake band, and coacting means on the clamping element and carrying members for attaching the sections to the brake band; the band with its lining being substantially cylindrical in form.

25. The combination with a brake band of a lining therefor, said lining composed of a plurality of sections, said brake band having an aperture adjacent the end of each section, a headed member passing through each aperture between adjacent sections and engaging said sections, means removably connected to the ends of the headed member whereby a section may be removed from the brake band, and friction material attached to each section.

In testimony whereof I affix my signature.

RICHARD B. HARTMAN.